May 28, 1968   J. D. ALLEN   3,385,311
HYDRAULIC FLOW DIVIDER
Filed Dec. 22, 1965
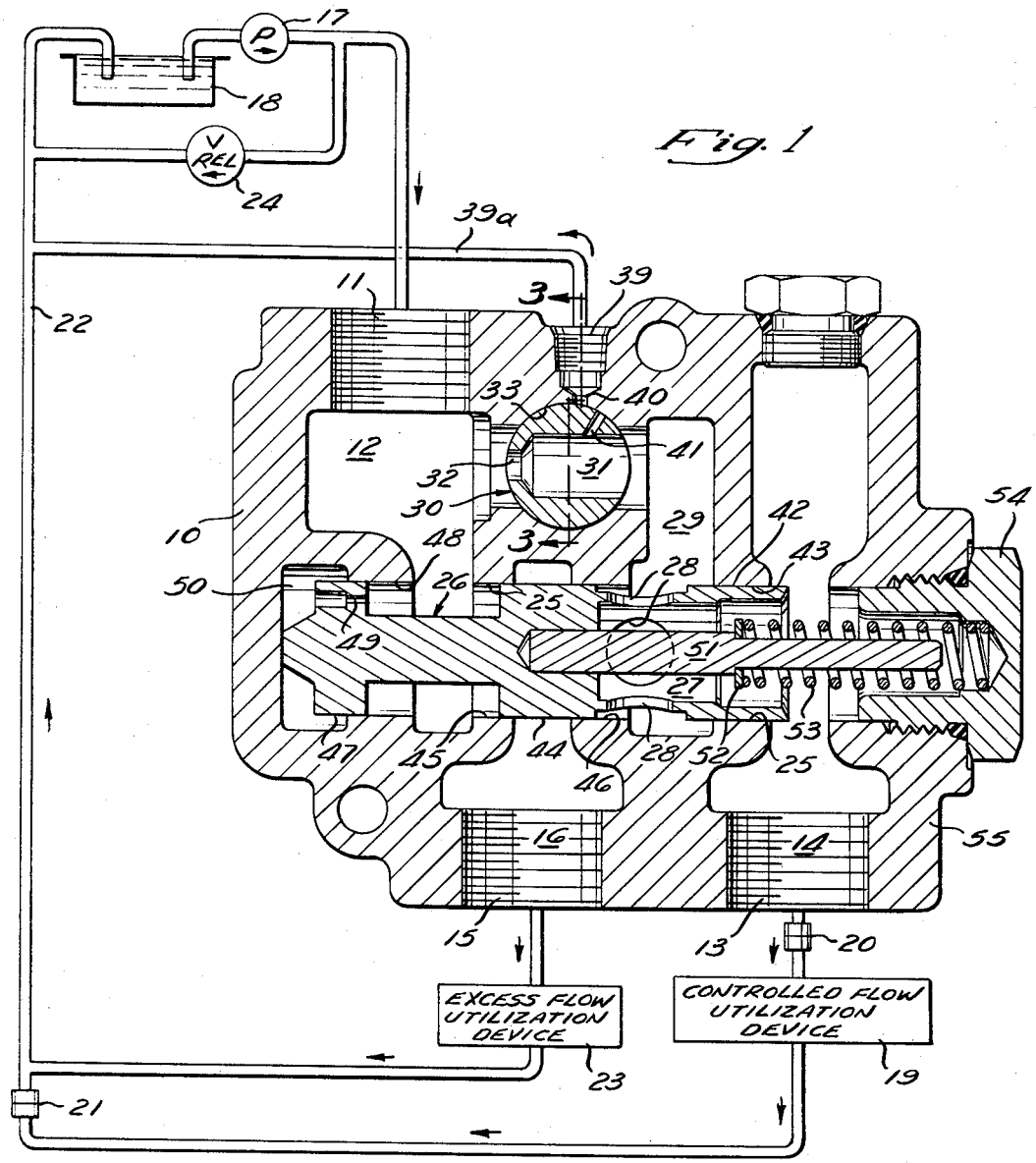
Fig. 1
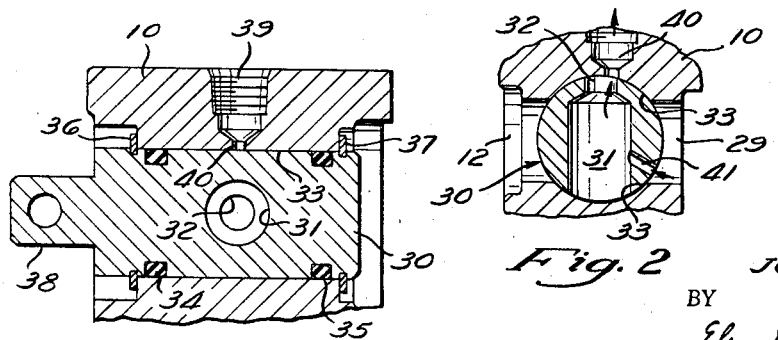
Fig. 2
Fig. 3
INVENTOR.
JOHN D. ALLEN
BY
Ely, Golrick + Flynn
ATTORNEYS United States Patent Office 3,385,311
Patented May 28, 1968

3,385,311
HYDRAULIC FLOW DIVIDER
John D. Allen, South Euclid, Ohio, assignor to Fawick Corporation, a corporation of Michigan
Filed Dec. 22, 1965, Ser. No. 515,672
4 Claims. (Cl. 137—101)

This invention relates to a hydraulic flow divider for dividing an input stream of hydraulic liquid into two separate output streams.

One type of flow divider now in use has a variable orifice device with a flow restriction therein which establishes a priority flow from the inlet passage to a controlled flow outlet passage. A valve piston is subjected to the fluid pressure differential across the orifice device to control the flow from the same inlet passage to an excess flow outlet passage. Preferably, this valve piston also controls the priority flow to the controlled flow outlet passage so that, for a given setting of the orifice device, the priority flow rate will remain constant despite varying upstream or downstream pressures.

In certain practical applications of such flow dividers, the load device operated by the controlled flow stream is detachable from the hydraulic system, and when it is detached the controlled flow outlet port of the flow divider is closed. Also, the orifice device in the flow divider will be closed to prevent fluid flow to the controlled flow outlet passage at this time. However, there may be leakage past the now-closed orifice device or past the valve piston in the flow divider, or both, which can cause a build-up of pressure at the controlled flow side of the valve piston and restrict the excess flow stream, which is now the only outlet stream from the flow divider.

The present invention is directed to a novel arrangement in the flow divider for positively preventing a pressure build-up at the controlled flow outlet passage under these circumstances. This novel arrangement includes a drain port in the flow divider and means for connecting the controlled flow outlet passage to this drain port when the orifice device is closed, so that any hydraulic liquid leaking into this passage will be passed to the drain port. In the preferred embodiment of this invention, the orifice device itself has a cross passage which provides this drain connection when the orifice device is closed.

It is the principal object of this invention to provide an improved flow divider having novel provision for preventing a pressure build-up at the controlled flow outlet passage when the orifice device is closed.

Further objects and advantages of this invention will be apparent from the following detailed description of a presently-preferred embodiment, which is illustrated in the accompanying drawing.

In the drawing:

FIGURE 1 is a view showing in enlarged longitudinal section the present flow divider connected in a hydraulic circuit, which is shown schematically, the orifice device in the flow divider being positioned open;

FIGURE 2 is an enlarged fragmentary longitudinal section showing the orifice device in its closed position in the FIG. 1 flow divider; and FIGURE 3 is a fragmentary section through the orifice device along the line 3—3 in FIG. 1.

Referring to FIG. 1, the present flow divider comprises a valve body 10 having a single inlet port 11 leading into an inlet passage 12, a controlled flow outlet port 13 leading from a controlled flow outlet passage 14 in the valve body, and an excess flow outlet port 15 leading from an excess flow outlet passage 16 in the valve body. The flow divider is shown connected in a hydraulic system which includes a pump 17 for pumping hydraulic liquid from a reservoir 18 to the inlet port 11, a controlled flow utilization device 19 having its inlet connected to the controlled flow outlet port 13 through a quick-disconnect coupling 20 of known design and having its outlet connected through a similar quick-disconnect coupling 21 to a return line 22 leading back to the reservoir, and an excess flow utilization device 23 having its inlet connected to the excess flow outlet port 15 and its outlet connected to the return line 22.

Each utilization device 19 and 23 may be any suitable hydraulically-operated load device or several such devices. In one practical embodiment, the controlled flow utilization device 19 may be a hydraulic motor-operated soil-compacting machine which is detachably mounted on a tractor-mounted boom. When this device is disconnected from the hydraulic circuit, the controlled flow outlet port 13 of the flow divider is closed automatically by a known arrangement which forms no part of the present invention. This is also true of the connection at 21 to the return line 22.

The hydraulic circuit also includes a conventional relief valve 24 connected between the pump outlet and the return line 22.

Turning now to the details of the flow divider, the inlet passage 12 and the two outlet passages 16 and 14 intersect a cylindrical bore 25 in the valve body at spaced locations along the length of this bore. A movable valve means in the form of a reciprocable piston 26 is slidably mounted in this bore. At its right end in FIG. 1 this valve piston has a longitudinal passage 27 leading from a plurality of cross openings 28 in the piston to the controlled flow outlet passage 14 in the valve body 10. The cross openings 28 in the piston register with an intermediate passage 29 in the valve body.

A variable orifice device 30 is positioned between the inlet passage 12 and the intermediate passage 29 which leads to the controlled flow outlet passage 14. This orifice device has a main flow passage 31 therethrough which includes a flow restriction 32. When the orifice device is in its fully open position, as shown in FIG. 1, this main flow passage 31 connects the inlet passage 12 to the controlled flow outlet passage 14 (by way of the intermediate passage 29 in the valve body and the cross openings 28 and passage 27 in the valve piston 26), and the flow restriction 32 produces a fluid pressure drop between these passages 12 and 14 in response to the flow of hydraulic liquid through this path.

As shown in FIGS. 1 and 3, the orifice device 30 is a generally cylindrical plug which is rotatably mounted in sealing engagement with a complementary bore 33 in the valve body. Near its opposite ends in FIG. 3 this plug carries resilient O-rings 34, 35 of rubber-like material which sealingly engage the wall of bore 33. Snap rings 36, 37 hold the plug against endwise displacement in the bore. At its left end in FIG. 3 the plug presents a stem 38, which projects beyond the valve housing 10 for the attachment of a handle or other means (not shown) for rotating the plug.

In accordance with the presently-preferred embodiment of the present invention, the valve body 10 is provided with a drain port 39 leading from a drain passage 40, which intersects the bore 33 in which the variable orifice device 30 is positioned. The drain port 39 is connected by a line 39a directly to the return line 22 of the hydraulic system. The orifice device 30 has a cross passage 41 which extends from its main flow passage 31 to its cylindrical periphery.

In the fully open position (FIG. 1) of the orifice device 30, its main flow passage 31 and cross passage 41 are both blocked from the drain passage 40 in the valve body. However, in the fully closed position of the orifice device (FIG. 2), in which it is turned 90° clockwise from the open position (FIG. 1), this cross passage 41 is open to the intermediate passage 29 in the valve body and the flow restriction 32 in the main flow passage 31 in the orifice device registers with the drain passage 40, so that the orifice device now connects the controlled flow outlet passage 14 to the drain port 39 in the valve body.

When the orifice device 30 is fully open (FIG. 1), the outer end of its cross passage 41 is sufficiently far away from the drain passage 40 that the seal between the abutting complementary surfaces of the bore 33 in valve body 10 and the orifice device 30 will prevent leakage to the drain port 39. As the orifice device is turned (clockwise in FIG. 1) to successively more restricted, partially open positions, this seal is enhanced because of the progressively increased spacing between the outer end of cross passage 41 and the drain passage 40. Consequently, there is substantially no leakage through the cross passage 41 in the orifice device 30 to the drain port 39 in the valve body in any position of the orifice device in which its main flow passage 31 (including the flow restriction 32) is open to the inlet passage 12.

The valve piston 26 at its right end in FIG. 1 presents a cylindrical valve surface 42 which sealingly, but slidably engages a complementary land surface 43 at the bore 25 in the valve body between the intermediate passage 29 and the controlled flow outlet passage 14.

Approximately midway along its length the valve piston 26 presents another cylindrical valve surface 44 which sealingly, but slidably, engages complementary land surface 45 and 46 at the bore 25 in the valve body on opposite sides of the excess flow outlet passage 16. The land surface 45 is positioned between the inlet passage 12 and the excess flow outlet passage 16. The land surface 46 is positioned between the excess flow outlet passage 16 and the intermediate passage 29 in the valve body.

Near its left end in FIG. 1 the valve piston presents a cylindrical end portion 47 which slidably engages a complementary land 48 at the bore 25 in the valve body just to the left of the inlet passage 12. This end portion 47 has a bleed passage 49 providing restricted fluid communication between the inlet passage 12 and a chamber 50 at the left end of bore 25, so as to provide a dashpot action when the valve piston moves.

A rigid stem 51 is attached to the valve piston 26 and projects to the right in FIG. 1. Midway along its length this stem carries a washer 52. A coil spring 53 is engaged under compression between this washer and a plug 54 seated in the right end wall 55 of the valve body, to the right of the controlled flow outlet passage 14 in FIG. 1.

Normally, spring 53 biases the valve piston 26 to the left, to the position shown in FIG. 1. In this position the valve piston completely blocks the excess flow outlet passage 16, while its right end projects just slightly across the controlled flow outlet passage 14 and does not interfere significantly with the flow of hydraulic liquid to the latter.

In the operation of this flow divider, the inlet flow to the inlet passage 12 in the valve body passes through the flow restriction 32 and the main flow passage 31 in the orifice device, and thence through the cross openings 28 and the longitudinal passage 27 in the valve piston, and past the right end of the valve piston to the controlled flow outlet passage 14. The flow restriction 32 in the orifice device produces a fluid pressure drop between the inlet passage 12 and the controlled flow outlet passage 14. The valve piston 26 presents oppositely facing surfaces which are exposed respectively to the fluid pressures on the opposite sides of the orifice device 30. The magnitude of the fluid pressure differential across the orifice device, and therefore the net fluid force urging valve piston 26 to the right, increases with increasing flow to outlet passage 14. Movement of valve piston 26 to the right causes the controlled flow outlet passage 14 to be partially blocked and also causes the excess flow outlet passage 16 to be uncovered, the net effect being that over a range of inlet flow pressures and load conditions there is a substantially constant flow rate to the controlled flow outlet passage 14 and the remainder of the inlet stream passes to the excess flow outlet passage 16.

When the controlled flow-operated device 19 is disconnected from the hydraulic circuit, the controlled flow outlet port 13 is closed and the orifice device 30 is turned to its fully closed position (FIG. 2). Normally, then, all of the inlet stream will be passed to the excess flow outlet passage 16. In prior flow dividers of this general type, however, leakage past the orifice device 30 or past the valve piston 26, or both, into the now-closed outlet passage 14 would produce a back pressure tending to move the valve piston 26 to the left so as to restrict the flow to the excess flow outlet passage 16. In the present invention, this undesirable effect is positively prevented because the orifice device 30 in its closed position (FIG. 2) connects the controlled flow outlet passage 14 to the drain port 39, by way of the intermediate valve body passage 29, the cross passage 41 and the main flow passage 31 in the orifice device, and the drain passage 40 in the valve body. Therefore, even if leakage does take place it will be passed to the return line and there can be no undesirable build-up of pressure at the controlled flow outlet passage 14 as long as the orifice device 30 remains closed.

While the particular arrangement shown in the drawing and described in detail above is the presently-preferred embodiment of this invention, it is to be understood that various modifications which differ from the particular arrangement disclosed may be adopted without departing from the spirit and scope of the present invention.

I claim:

1. In a flow divider comprising a valve body having an inlet passage and separate controlled flow and excess flow outlet passages, an orifice device having a flow restriction therein and adjustably mounted in said body between said inlet passage and said controlled flow outlet passage, said orifice device being movable to a closed position to shut off fluid flow to said controlled flow outlet passage, and movable valve means in said body responsive to the pressure differential across said flow restriction to control fluid flow to said excess flow outlet passage, the improvement which comprises means defining a drain port in said valve body, and means for connecting said controlled flow outlet passage to said drain port when said orifice device is positioned closed.

2. A flow divider according to claim 1 wherein said orifice device has a main flow passage including said flow restriction which is blocked from said drain port and provides fluid communication between said inlet passage and said controlled flow outlet passage when the orifice device is positioned open and which is in fluid communication with said drain port and blocked from said inlet passage when the orifice device is positioned closed, and said last-mentioned means is a cross passage in the orifice device intersecting said main flow passage therein, said cross passage being blocked from said drain port when the orifice device is positioned open and being in fluid communication with said controlled flow outlet passage when the orifice device is positioned closed.

3. A flow divider according to claim 2 wherein said orifice device is a plug rotatably mounted in the valve body to be turned between said open and closed positions.

4. A flow divider according to claim 3 wherein said movable valve means in the valve body is a reciprocable piston having oppositely-facing surfaces exposed respectively to the fluid pressures on the opposite sides of said orifice device, said piston also having first and second valve surfaces which respectively control fluid flow through said controlled flow and excess flow outlet passages, and spring means biasing said piston to a position in which said first valve surface permits fluid flow through said controlled flow outlet passage and said second valve surface closes said excess flow outlet passage, said piston being movable against the bias of said spring means in response to increasing pressure differential across said flow restriction to open said excess flow outlet passage and to partially close said controlled flow outlet passage so as to limit the fluid flow to said controlled flow outlet passage.

References Cited

UNITED STATES PATENTS 3,234,957  2/1966  Allen _____ 137—117

WILLIAM F. O'DEA, *Primary Examiner.*

H. M. COHN, *Assistant Examiner.*